(12) United States Patent
Tsai

(10) Patent No.: US 10,723,559 B2
(45) Date of Patent: Jul. 28, 2020

(54) TRANSPORT MECHANISM AND METHOD FOR TRANSPORTING OBJECTS

(71) Applicant: CHAN LI MACHINERY CO., LTD., Taoyuan (TW)

(72) Inventor: Tung-I Tsai, Taoyuan (TW)

(73) Assignee: Chan Li Machniery Co., Ltd., Taoyuan (TW)

( * ) Notice: Subject to any disclaimer, the term of this patent is extended or adjusted under 35 U.S.C. 154(b) by 0 days.

(21) Appl. No.: 16/194,562

(22) Filed: Nov. 19, 2018

(65) Prior Publication Data

US 2019/0283970 A1 Sep. 19, 2019

(30) Foreign Application Priority Data

Mar. 16, 2018 (TW) .............................. 107109057 A

(51) Int. Cl.
*B65G 17/46* (2006.01)
*B65G 15/14* (2006.01)
*B65G 15/24* (2006.01)
*B65G 39/10* (2006.01)
*B65G 37/00* (2006.01)

(52) U.S. Cl.
CPC ............. *B65G 17/46* (2013.01); *B65G 15/14* (2013.01); *B65G 15/24* (2013.01); *B65G 39/10* (2013.01); *B65G 37/005* (2013.01); *B65G 2207/02* (2013.01); *B65G 2207/14* (2013.01); *B65G 2207/36* (2013.01)

(58) Field of Classification Search
None
See application file for complete search history.

(56) References Cited

U.S. PATENT DOCUMENTS

| | | | |
|---|---|---|---|
| 6,705,452 B2 * | 3/2004 | Greve .................. | B65G 17/005 198/370.02 |
| 7,571,797 B2 * | 8/2009 | Lee ......................... | B66B 23/24 198/335 |
| 10,059,530 B2 * | 8/2018 | Elejalde .................. | B65G 17/34 |
| 2010/0080673 A1 * | 4/2010 | Von Der Waydbrink | ................... C23C 14/50 414/222.01 |

* cited by examiner

*Primary Examiner* — Kavel Singh
(74) *Attorney, Agent, or Firm* — Rosenberg, Klein & Lee

(57) ABSTRACT

A transport mechanism and a method for transporting objects are disclosed. The transport mechanism includes a transport unit, a vacuum belt conveyor unit, and a push-type transport unit. The vacuum belt conveyor unit receives objects from the transport unit and conveys the received objects to the push-type transport unit. The vacuum belt conveyor unit can generate a vacuum force to adhere the plurality of objects thereon. When the vacuum belt conveyor unit stops conveying the objects carried thereon, the objects adhered to the vacuum belt conveyor unit would block the objects being transported by the transport unit, and when the vacuum belt conveyor unit starts to convey the objects carried thereon to the push-type transport unit, the transport unit would immediately transport more objects to the vacuum belt conveyor unit. Thus, with the vacuum belt conveyor unit, the objects are conveyed to the push-type transport unit and the position of objects is also accurately controlled.

13 Claims, 4 Drawing Sheets

TRANSPORT MECHANISM AND METHOD FOR TRANSPORTING OBJECTS

REFERENCE TO RELATED APPLICATIONS

This non-provisional application claims priority claim under 35 U.S.C. § 119(a) on Taiwan Patent Application No. 107109057 filed Mar. 16, 2018, the entire contents of which are incorporated herein by reference.

FIELD OF THE INVENTION

The invention relates to a transport mechanism and a method for transporting objects, more particularly, to a transport mechanism and a method for transporting objects with a vacuum belt conveyor unit, wherein objects carried by the vacuum belt conveyor unit are adhered to the vacuum belt conveyor unit, and the objects adhered to the vacuum belt conveyor unit can block upstream objects and control the position of the upstream objects.

BACKGROUND

A conventional transport mechanism 10, as shown in FIG. 1, would include a transport unit 11 and a blocking device 13. The transport unit may have a plurality of rollers 111 and a conveyor belt 113 looped around the plurality of rollers 111. When one of the rollers 111 rotates, the conveyor belt 113 is driven and thus objects 12 carried on the conveyor belt 113 are moved towards a specific direction.

The blocking device 13 is placed above the transport unit 11 and is vertically movable relative to the transport unit 11. The blocking device 13 is also disposed on a path along which the transport unit 11 transports the objects 12, and therefore when the blocking device 13 is moved extendedly towards the transport unit 11, the blocking device 13 blocks the objects 12 on the transport unit 11 from advancing forward. When the blocking device 13 is moved away from the transport unit 11, it does not block the objects 12 and its path, so that the transport unit 11 continues to transport the objects 12 it carries.

Although the abovementioned transport mechanism 10 can carry out the conveyance of the objects 12 and can use the blocking device 13 to control where the objects 12 stops, the stopping location of the objects 12 cannot be precisely controlled by the blocking device 13. Moreover, in practical application, the blocking device 13 must bear the force from many objects 12 when blocking the objects 12 from advancing forward on the transport unit 11 and thus may cause the blocking device 13 to break.

SUMMARY

The invention provides a transport mechanism including a transport unit, a vacuum belt conveyor unit, and a push-type transport unit, wherein the vacuum belt conveyor unit is disposed between the transport unit and the push-type transport unit. The vacuum belt conveyor unit is used to adhere with a plurality of objects thereon. When the vacuum belt conveyor unit is paused and stops conveying the objects carried thereon, the objects adhered to the vacuum belt conveyor unit block the objects carried and transported by the transport unit and stop them from going forward. When the objects carried on the vacuum belt conveyor unit are conveyed to the push-type transport unit, more of the objects carried on the transport unit are immediately transported and passed onto the vacuum belt conveyor unit. Hence, the position of the objects carried by an upstream device (the transport unit) can be controlled by controlling the operation of the vacuum belt conveyor unit to be on or off.

The invention provides a transport mechanism which includes a transport unit, a vacuum belt conveyor unit, and a push-type transport unit, wherein the vacuum belt conveyor unit is disposed between the transport unit and the push-type transport unit. The vacuum belt conveyor unit has a conveyor belt with a plurality of through holes for generating a vacuum force to adhere the objects carried on the vacuum belt conveyor unit. The transport unit runs (operates) continuously so the objects on the transport unit are continuously transported and keep pushing the objects adhered to the vacuum belt conveyor unit. When the vacuum belt conveyor unit conveys the objects to the push-type transport unit, the transport unit immediately transports more of the objects carried thereon to the vacuum belt conveyor unit, such that a full load of objects is kept on the vacuum belt conveyor unit at all time and the through holes on the conveyor belt of the vacuum belt conveyor unit continue to be covered by the objects, thereby avoiding an impact on the vacuum force generated by the vacuum belt conveyor unit.

The present invention provides a transport mechanism, which includes a transport unit, a vacuum belt conveyor unit, and a push-type transport unit, wherein the vacuum belt conveyor unit is disposed between the transport unit and the push-type transport unit. The transport mechanism not only can be used to transport objects, it can also quickly and accurately control the position of the objects through the vacuum belt conveyor unit. Moreover, unlike conventional technology, the transport mechanism does not need to implement an extra blocking device, and yet it is capable of dispersing the force coming from blocking the objects transported by the transport unit and reducing the chance of damaging the transport mechanism at the same time.

The present invention provides a method for transporting objects by a transport mechanism having a vacuum belt conveyor unit disposed between a transport unit and a push-type transport unit, wherein the vacuum belt conveyor unit is used to adhere with the objects carried thereon. When the vacuum belt conveyor unit stops conveying the objects, the objects adhered thereto and carried thereon block the objects carried on and transported by the transport unit. And when the vacuum belt conveyor unit starts to convey the objects, the transport unit immediately transports more of the objects carried thereon to the vacuum belt conveyor unit, thereby accurately controlling the position of the objects being transported.

The present invention provides a transport mechanism which includes a transport unit, a vacuum belt conveyor unit, and a push-type transport unit. The transport unit is used to transport a plurality of objects and each of the objects is closely lined up on the transport unit. The vacuum belt conveyor unit is coupled to the transport unit for receiving the objects from the transport unit, and each of the objects received is closely lined up on the vacuum belt conveyor unit and adhere to the vacuum belt conveyor unit. When the vacuum belt conveyor unit stops conveying the objects carried thereon, the objects on the vacuum belt conveyor unit block the objects being transported by the transport unit, and when the vacuum belt conveyor unit starts to convey the objects carried thereon, the transport unit immediately transports more objects carried thereon to the vacuum belt conveyor unit. The push-type transport unit is coupled to the vacuum belt conveyor unit for receiving the objects from the vacuum belt conveyor unit; the push-type transport unit transports the objects received by pushing.

The present invention provides a method for transporting objects by a transport mechanism, wherein the transport mechanism includes a transport unit, a vacuum belt conveyor unit and a push-type transport unit. The transport method includes: transporting a plurality of objects by the transport unit, wherein each of the objects is closely lined up on the transport unit; receiving the objects from the transport unit by the vacuum belt conveyor unit, wherein each of the objects received is closely lined up on the vacuum belt conveyor unit and is adhered to the vacuum belt conveyor unit; stopping conveying the objects carried on the vacuum belt conveyor unit and blocking the objects transported by the transport unit with the objects on the vacuum belt conveyor unit; starting to convey the objects carried on the vacuum belt conveyor unit; transporting more objects carried on the transport unit to the vacuum belt conveyor unit; and receiving the objects from the vacuum belt conveyor unit by the push-type transport unit and transporting the objects received by pushing.

In one embodiment of the invention, the transport unit continuously transports the objects carried thereon for the objects from the transport unit to push the objects adhered to the vacuum belt conveyor unit tightly together.

In one embodiment of the invention, the vacuum belt conveyor unit includes a plurality of rollers and at least one conveyor belt, wherein the conveyor belt is looped around the plurality of rollers and has a plurality of through holes formed thereon.

In one embodiment of the invention, the vacuum belt conveyor unit further includes a box and a vacuum-generating device. The box has a space that is disposed in intimate contact with a portion of the conveyor belt, whereby the through holes of the portion of the conveyor belt are in communication with the space. When the vacuum-generating device sucks air out of the space, a vacuum force is generated in the through holes that are in communication with the space to adhere the objects carried on the conveyor belt thereto.

In one embodiment of the invention, the transport unit operates at a speed faster than a speed at which the vacuum belt conveyor unit operates.

In one embodiment of the invention, the transport unit includes a plurality of rollers and at least one conveyor belt. The at least one conveyor belt is looped around the plurality of rollers and is driven by the rollers to transport the objects carried thereon.

In one embodiment of the invention, the conveyor belt of the transport unit is made of a material with low friction coefficient.

In one embodiment of the invention, the push-type transport unit includes a plurality of rollers, at least one conveyor belt, and at least one push rod. The conveyor belt is looped around the plurality of rollers and coupled to the push rod. When the rollers rotate, the conveyor belt is driven to transport the objects by pushing the objects with the push rod.

In one embodiment of the invention, further includes a feeding unit coupled to the transport unit for feeding the objects to the transport unit.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
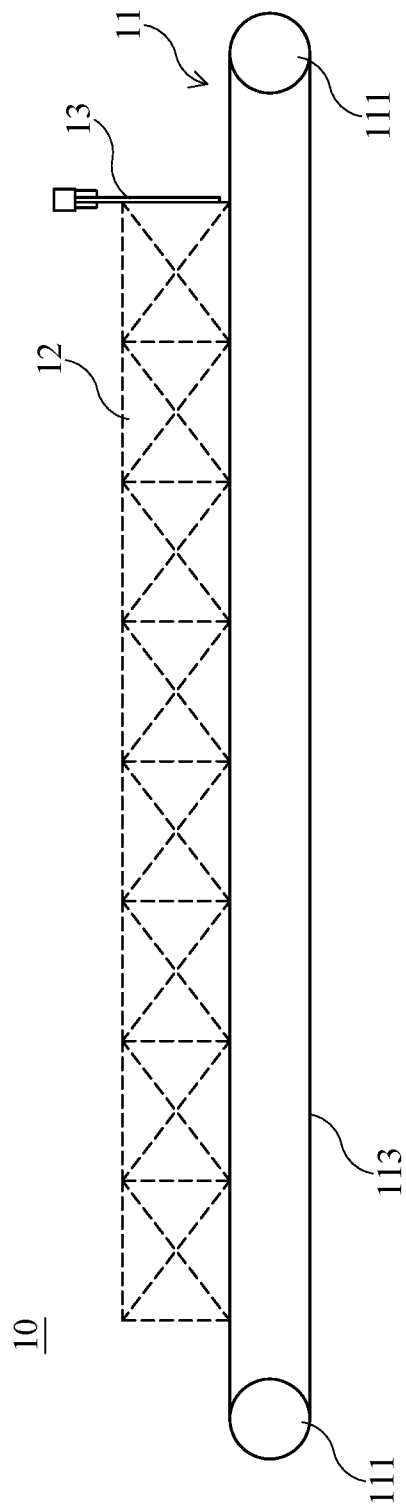
FIG. 1 is a side view of a schematic diagram illustrating a conventional transport mechanism.
Figure 2:
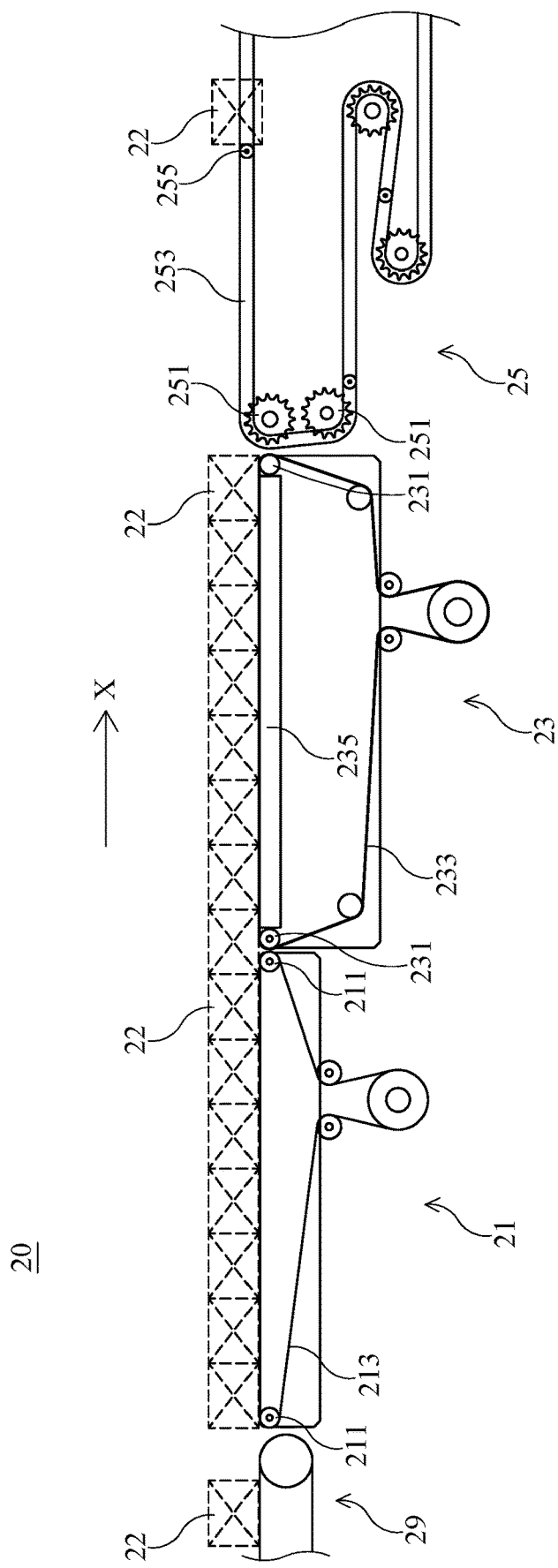
FIG. 2 is a schematic diagram of a transport mechanism according to an embodiment of the invention.
Figure 3:
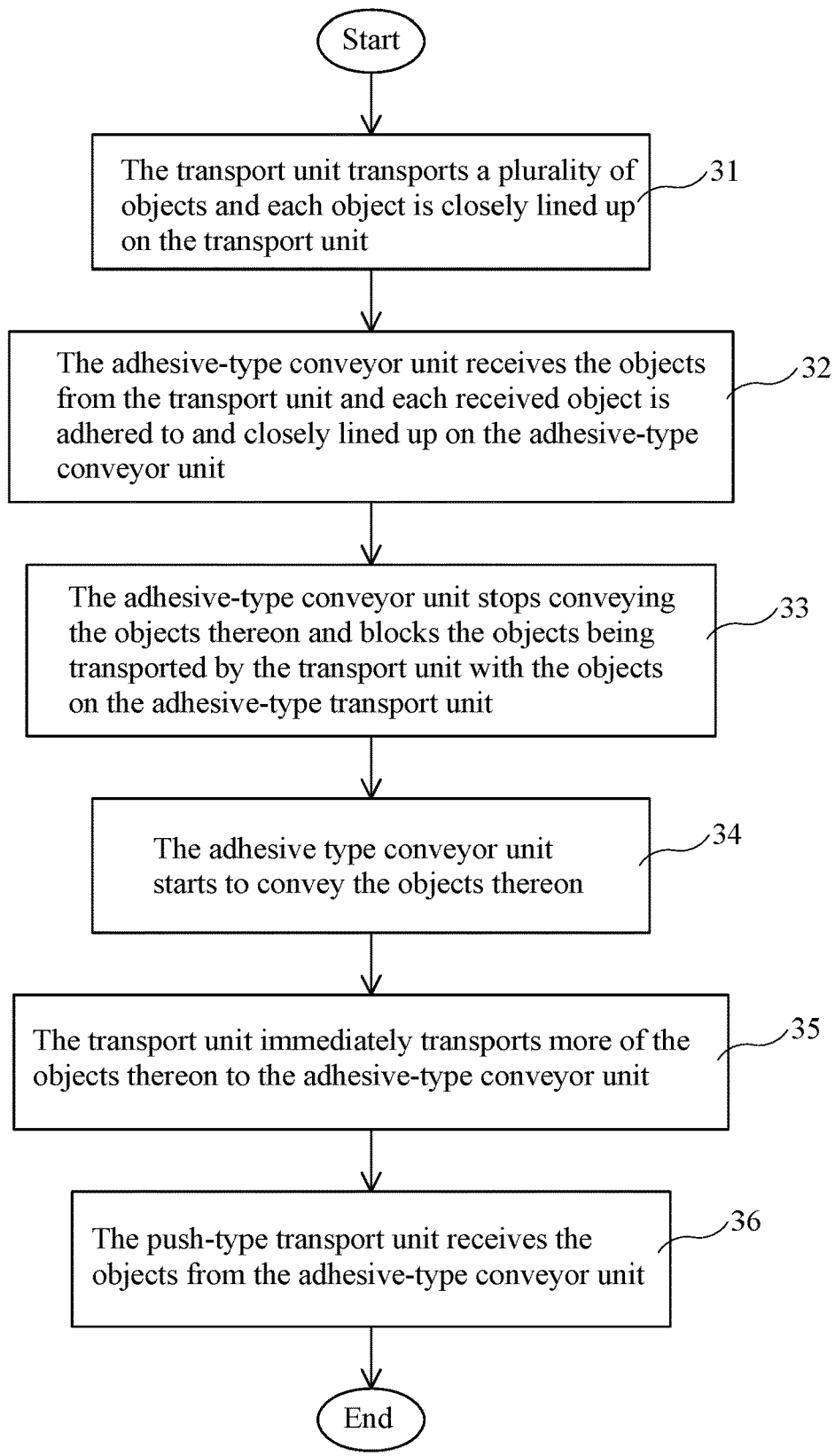
FIG. 3 is a flow chart illustrating the steps of a method for transporting objects according to an embodiment of the invention.

FIGS. 2 and 3 are, respectively, a schematic diagram of a transport mechanism and a flow chart illustrating the steps of a transport method thereof according to a preferred embodiment of the invention. The transport mechanism 20 includes a transport unit 21, a vacuum belt conveyor unit 23, and a push-type transport unit 25, wherein the vacuum belt conveyor unit 23 is disposed between the transport unit 21 and the push-type transport unit 25. The vacuum belt conveyor unit 23 is used to receive objects 22 from the transport unit 21 and convey the received objects 22 to the push-type transport unit 25. In one embodiment of the invention, the objects can be toilet paper or tissue paper packaged in bags.

The transport unit 21 includes a plurality of rollers 211 and at least one conveyor belt 213. The conveyor belt 213 is looped around the plurality of rollers 211, and when one of the rollers 211 rotates, the conveyor belt 213 is driven by the roller 211 to move and thus transports the objects 22 carried on the conveyor belt 213. In specific, one of the rollers 211 can be coupled to a motor and is driven to rotate by the motor.

In one of the embodiment, the other end of the transport unit 21 is coupled to a feeding unit 29 and the transport unit 21 receives the objects 22 from the feeding unit 19. The feeding unit 29 can be another conveyor belt that transports or feeds the objects 22 to the transport unit 21.

One end of the vacuum belt conveyor unit 23 is coupled to the transport unit 21 and the other end is coupled to the push-type transport unit 25. In other words, the vacuum belt conveyor unit 23 is disposed downstream of the transport unit 21 and receives the objects 22 from the transport unit 21, and the push-type transport unit 25 is disposed downstream of the vacuum belt conveyor unit 23 and receives the objects 22 from the vacuum belt conveyor unit 23.

More specifically, the transport unit 21 is used to transport a plurality of objects 22, and each of the objects 22 is closely lined up on the transport unit 21 as shown in step 31. In step 32, the vacuum belt conveyor unit 23 receives the objects 22 from the transport unit 21, wherein the received objects 22 are also closely lined up on the vacuum belt conveyor unit 23 and are adhered thereto.

Figure 4:
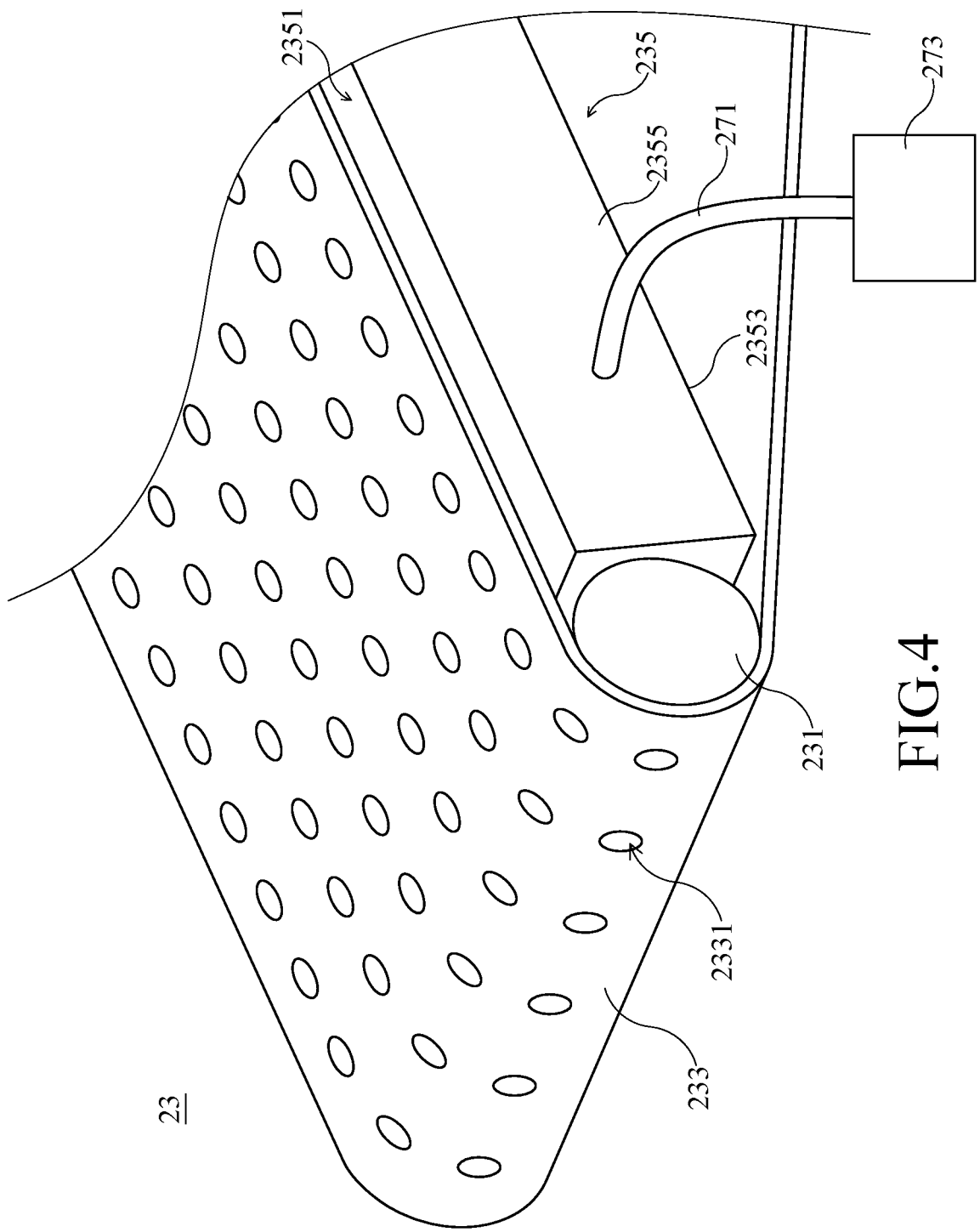
FIG. 4 is a schematic diagram illustrating a vacuum belt conveyor unit of the transport mechanism according to an embodiment of the invention.

The vacuum belt conveyor unit 23 can generate negative pressure to create a vacuum force, through which the objects 22 are adhered to the vacuum belt conveyor unit 23, thereby preventing the displacement of the objects 22 relative to the vacuum belt conveyor unit 23. FIG. 4 is a schematic diagram of the vacuum belt conveyor unit 23 according to an embodiment of the invention. The vacuum belt conveyor unit 23 includes a plurality of rollers 231, at least one conveyor belt 233, and a box 235. The conveyor belt 233 has a plurality of through holes 2331 formed thereon and is looped around the plurality of rollers 231, wherein rotation of the rollers 231 drives the conveyor belt 233. The rotation of the rollers 231 can be actuated by, for example, coupling one of the rollers 231 to a motor, wherein the motor drives the roller 231 to rotate, which in turn drives the conveyor belt 233 to convey the objects 22 carried on the conveyor belt 233.

The box 235 is a cuboid or a polygonal prism and has a g space 2351. In this embodiment, the box 235 is a cuboid and includes a base 2353 and a plurality of sidewalls 2355. The plurality of sidewalls 2355 is disposed around the base 2353, and together they form the space 2351. When installing the box 235, the space 2351 of the box 235 is in intimate contact with the conveyor belt 233, for example, adjacent to the inner surface or lower/bottom surface of the conveyor belt 233.

The box 235 is connected to a vacuum-generating device 273 via at least one tube 271, wherein the vacuum-generating device 273 sucks air out of the space 2351 of the box 235 via the tube 271 to make the pressure in the space 2351 lower than that of the outside environment. Because the space 2351 of the box 235 is in intimate contact with the conveyor belt 233, the through holes 2331 on a portion of the conveyor belt that is adjacent to the box 235 are in communication with the space 2351 of the box 235, thus a vacuum force is also generated in the through holes 2331 on the portion of the conveyor belt that is adjacent to the box 235. When the objects 22 are transported to the adhesive-type conveyor unit 23, the objects 22 that are on top or in vertical extension of the space 2351 of the box 235 will be adhered by the vacuum force generated in the through holes 2331 of the conveyor belt 223.

The transport unit 21 of the invention transports the objects 22 to the vacuum belt conveyor unit 23 continuously, so as to keep a full load of the objects 22 on the vacuum belt conveyor unit 23, wherein the plurality of objects 22 are closely lined up on the vacuum belt conveyor unit 23 where the vertical extension of the box 235 is at, such that the objects 22 cover or block the through holes 2331 on the portion of the conveyor belt 233 that is on the vertical extension of the space 2351 of the box 235, and so the negative pressure has an effect on the objects 22, thereby adhering the objects 22 to the conveyer belt 233 of the vacuum belt conveyor unit 23.

Since the objects 22 are adhered to the vacuum belt conveyor unit 23, when the vacuum belt conveyor unit 23 has an emergency where it suddenly starts or stops, the objects 22 being carried on the vacuum belt conveyor unit 23 does not move or slide relative to the vacuum belt conveyor unit 23. Therefore, through operating the on and off of the vacuum belt conveyor unit 23, the position of the objects 22 being conveyed by the vacuum belt conveyor unit 23 is accurately controlled.

In addition, when the vacuum belt conveyor unit 23 stops conveying the objects 22 being carried thereon, because the objects 22 are adhered to the vacuum belt conveyor unit 23, the objects 22 on the vacuum belt conveyor unit 23 would block the objects 22 being transported by the transport unit 21, so that the objects 22 adhered to the vacuum belt conveyor unit 23 act as the conventional blocking device, and can precisely and quickly block the objects 22 upstream of the vacuum belt conveyor unit 23, as shown in step 33. When the vacuum belt conveyor unit 23 starts to convey the objects 22 carried thereon as shown in step 34, the transport unit 21 will immediately transport more of the objects 22 thereon to the vacuum belt conveyor unit 23 as shown in step 35.

Referring to FIG. 4, since the through holes 2331 on the conveyor belt 233 of the vacuum belt conveyor unit 23 are in communication with the space 2351 of the box 235, when some of the through holes 2331 that are in communication with the space 2351 of the box 235 do not adhere to the objects 22, the vacuum force (suction by negative pressure) in other through holes 2331 may decrease, and thereby causing the vacuum belt conveyor unit 23 to unstably adhere to the objects 22.

In order to avoid the abovementioned problem, the transport unit 21 in the invention transports the objects 22 continuously towards the direction of the vacuum belt conveyor unit 23, for example, the non-stop transporting of objects 22 by the transport unit 21 would result in the objects 22 being closely lined up on the vacuum belt conveyor unit 23 and the transport unit 21.

In one embodiment, the transport unit 21 runs and operates at a speed slightly faster than a speed at which the vacuum belt conveyor unit 23 runs and operates. In other words, the transport unit 21 transports the objects 22 at a faster speed, such that the objects 22 on the transport unit 21 would continuously push the objects 22 on the vacuum belt conveyor unit 23.

Moreover, since the vacuum belt conveyor unit 23 can generate a vacuum force and adhere with the objects 22 carried thereon, when the adhesion (vacuum force) of the vacuum belt conveyor unit 23 is strong and reaches a certain level, the objects 22 adhered to the vacuum belt conveyor unit 23 would not be moved when being pushed by the objects 22 transported by the transport unit 22. Thus, the objects 22 on the vacuum belt conveyor unit 23 can block the objects 22 on the transport unit 21 from moving towards a first direction X.

In particular, when the vacuum belt conveyor unit 23 is paused/stopped during operation (conveyance), the transport unit 21 does not stop running/operating, and so the objects 22 on the transport unit 21 would keep pushing the objects 22 on vacuum belt conveyor unit 23. But due to the adhesion/vacuum force between the vacuum belt conveyor unit 23 and the objects 22 carried thereon, the objects 22 on the vacuum belt conveyor unit 23 can be used to block the objects 22 on the transport unit 21. In addition, since the vacuum belt conveyor unit 23 would adhere and/or carry a plurality of objects 22 at the same time, the push force from the object 22 on the transport unit 21 is spread and dispersed onto each of the objects 22 on the vacuum belt conveyor unit 23, thereby greatly reducing the probability of the objects 22 adhered to the vacuum belt conveyor unit 23 being pushed away by the objects 22 on the transport unit 21.

In one embodiment, the conveyor belt 213 of the transport unit 21 made of a material with lower friction coefficient is chosen to decrease the push force applied on the objects 22 on the vacuum belt conveyor unit 23 by the objects 22 on the transport 21.

Furthermore, since the transport unit 21 keeps pushing the objects 22 adhered to the vacuum belt conveyor unit 23, when the vacuum belt conveyor unit 23 drives the objects 22 adhered thereto to move towards the direction of the push-type transport unit 25, the transport unit 21 naturally would transport the objects 22 carried thereon to the vacuum belt conveyor unit 23 immediately. Hence, the objects 22 are closely lined up on the vacuum belt conveyor unit 23 and the through holes 2331 on the portion of the conveyor belt 233 that is positioned above the space 2351 of the box 235 are covered by the closely lined up objects 22, preventing any through hole 2331 on top and in communication with the space 2351 of the box 235 from not adhering to the objects 22, which in turn causes a reduction in the adhesion generated in the through hole 2331 and ultimately leads to an unstable adhesion between the vacuum belt conveyor unit 23 and the objects 22.

In one embodiment, the vacuum belt conveyor unit 23 includes a detecting unit for detecting the position of the objects 22 carried on the vacuum belt conveyor unit 23 and controlling the pause/stop or start of the conveyance of the objects 22 based on the detection result.

The push-type transport unit 25 includes a plurality of rollers 251, at least one conveyor belt 253 and at least one push rod 255, wherein the conveyor belt 253 is looped around the plurality of rollers 251 and is coupled to the at least one push rod 255. When one of the rollers 251 rotates, the conveyor belt 253 and the push-rod 255 coupled thereto are driven by the roller 251 to move and thus transports the objects 22, wherein the push rod 255 pushes the objects 22 on the push-type transport unit 25.

A specific gap is formed between each of the push rods 255 on the push-type transport unit 25 and a single push rod 255 can push a specific amount of objects 22. Take a push rod 255 of the push-type transport unit 25 pushing an object 22 as an example, after the push rod 255 of the push-type transport unit 25 arrives/attends at a specific/predetermined location, the vacuum belt conveyor unit 23 conveys an object 22 to the push-type transport unit 25 and the push-rod 255 of the push-type transport unit 25 receives the object 22 from the vacuum belt conveyor unit 23 and pushes the object 22 along the first direction X, as shown in step 36. After the push-type transport unit 25 receives the object 22, the vacuum belt conveyor unit 23 pauses/stops conveying the objects 22, and the vacuum belt conveyor unit 23 starts to the next object 22 to the push-type transport unit 23 again when the next push-rod 255 arrives at the predetermined location.

The push-type transport unit 25 transports the objects 22 by pushing, which allows a specific distance gap or time gap between two adjacent objects 22, not only is it advantageous for calculating the quantity of objects 22 being transported, it is also useful for further packaging multiple objects 22 after the objects 22 have reached a preset amount.

In conclusion, the transport mechanism 20 of the invention not only can be used to transport objects 22, it also can control the position of the objects 22 fast and precisely. Moreover, unlike conventional technology, the transport mechanism 20 does not need to install an extra blocking device (13) and can also disperse the force from the blocked objects 22 being transported by the transport unit 21 and reduce damages to the transport mechanism 20.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A transport mechanism comprising:
  a transport unit operatively transporting a plurality of objects along a transport path, each of the plurality of objects being closely spaced one from an adjacent other of the plurality of objects on the transport unit;
  a vacuum belt conveyor unit coupled to the transport unit and sequentially receiving the objects therefrom, the vacuum belt conveyor unit displaceably moving the objects thereon when the vacuum belt conveyor unit is operating, each of the objects received being closely spaced one from an adjacent other of the plurality of objects on the vacuum belt conveyor unit and being securely held in a fixed position thereon, wherein responsive to the displaceable movement of the objects held on the vacuum belt conveyor unit being stopped, the objects held on the vacuum belt conveyor unit block the objects being transported by the transport unit from being transferred to the vacuum belt conveyor as the transport unit continues to operate, the continued operation of the transport unit thereby sequentially positioning the objects on the transport unit in stationary contiguous relationship along the transport path, and responsive to the vacuum belt conveyor unit subsequently starting to convey the objects held thereon, the transport unit immediately begins to transfer the objects thereon to the vacuum belt conveyor unit; and
  a push-type transport unit coupled to the vacuum belt conveyor unit, wherein the push-type transport unit receives the objects from the vacuum belt conveyor unit and pushes the objects received thereon.

2. The transport mechanism of claim 1, wherein the vacuum belt conveyor unit comprises a plurality of rollers and at least one conveyer belt, the conveyor belt has a plurality of through holes formed therein and is looped around the plurality of rollers.

3. The transport mechanism of claim 2, wherein the vacuum belt conveyor unit further comprises a vacuum-generating device and a box with a space in communication with the vacuum-generating device, the space is disposed in intimate contact with a portion of the conveyor belt and in communication with the through holes of the portion of the conveyer belt, when the vacuum-generating device sucks air from the space, a vacuum force is generated in the through holes that are in communication with the space to hold the objects in the fixed position on the conveyor belt.

4. The transport mechanism of claim 1, wherein the transport unit operates at a speed faster than that of the vacuum belt conveyor unit.

5. The transport mechanism of claim 1, wherein the transport unit comprises a plurality of rollers and at least one conveyor belt looped around the plurality of rollers, the conveyor belt is driven by the rollers to transport the objects.

6. The transport mechanism of claim 5, wherein the conveyor belt of the transport unit is made of a material with a low friction coefficient sufficient to thereby slide past the stationary objects along the transport path.

7. The transport mechanism of claim 1, wherein the push-type transport unit comprises a plurality of rollers, at least one conveyor belt and at least one push rod, the conveyor belt is looped around the plurality of rollers and coupled to the push rod, when the rollers rotate, the conveyor belt is driven to transport the objects by pushing the objects with the push rod.

8. The transport mechanism of claim 1, further comprising a feeding unit coupled to the transport unit for feeding the objects to the transport unit.

9. The transport mechanism of claim 1, wherein the transport unit comprises a plurality of rollers and at least one conveyor belt looped around the plurality of rollers and displaceably driven by at least one of the plurality of the rollers, the conveyor belt of the transport unit being formed of a material having a low friction coefficient sufficient to thereby slide past the stationary objects along the transport path.

10. A method for transporting objects by a transport mechanism, wherein the transport mechanism comprises a transport unit, a vacuum belt conveyor unit and a push-type transport unit, the method comprising:

operatively transporting a plurality of objects along a transport path by the transport unit, wherein each of the objects is closely spaced one from an adjacent other of the plurality of objects on the transport unit;

sequentially receiving the objects from the transport unit by the vacuum belt conveyor unit and displaceably moving the objects thereon when the vacuum belt conveyor unit is operating, wherein each of the objects received is closely spaced one from an adjacent other of the plurality of objects on the vacuum belt conveyor unit and is securely held in a fixed position thereon;

stopping the displaceable movement of the objects held on the vacuum belt conveyor unit and thereby blocking transfer of the objects being transported by the transport unit to the vacuum belt conveyor unit with the objects held on the vacuum belt conveyor unit as the transport unit continues to operate, and wherein the continued operation of the transport unit thereby sequentially positions the objects on the transport unit in stationary contiguous relationship along the transport path;

resuming the displaceable movement of the objects held on the vacuum belt conveyor unit;

immediately beginning transfer of the objects from the transport unit to the vacuum belt conveyor unit responsive to the resumption of the movable displacement of the objects held on the vacuum belt conveyor unit; and receiving the objects from the vacuum belt conveyor unit by the push-type transport unit and pushing the objects received thereon.

11. The method of claim 10, further comprising: feeding the objects to the transport unit from a feeding unit.

12. The method of claim 10, further comprising providing the vacuum belt conveyor unit with at least one conveyor belt formed of a material having a low friction coefficient sufficient to thereby slide past the stationary objects along the transport path.

13. A transport mechanism comprising:

a transport unit having a conveyor belt drivingly displaced to transport a plurality of objects along a transport path, each of the plurality of objects being initially positioned in spaced relationship on the conveyor belt;

a vacuum belt conveyor unit coupled to the transport unit and sequentially receiving the objects therefrom, the vacuum belt conveyor unit displaceably moving the objects thereon when the vacuum belt conveyor unit is operating, each of the objects received from the transport unit being disposed in spaced relationship on the vacuum belt conveyor unit and being securely held in a fixed position thereon, wherein responsive to the displaceable movement of the objects held on the vacuum belt conveyor unit being stopped, the objects held on the vacuum belt conveyor unit block the objects being transported on the conveyor belt of the transport unit from being transferred to the vacuum belt conveyor unit as the conveyor belt of the transport unit continues to be displaced, the conveyor belt being slidably displaced beneath the blocked objects and thereby sequentially positions the objects on the transport unit in stationary contiguous relationship along the transport path, and responsive to the vacuum belt conveyor unit subsequently starting to convey the objects held thereon, the conveyor belt immediately begins to transfer the objects thereon to the vacuum belt conveyor unit; and a push-type transport unit coupled to the vacuum belt conveyor unit, wherein the push-type transport unit receives the objects from the vacuum belt conveyor unit and pushes the objects received thereon.

* * * * *